United States Patent
Fruehling

(10) Patent No.: US 8,196,697 B2
(45) Date of Patent: Jun. 12, 2012

(54) DRIVING ACCESSORY FOR HANDICAPPED DRIVERS

(75) Inventor: Yoram Fruehling, Kfar Saba (IL)

(73) Assignee: Yoram Fruehling Driving Systems, Ltd., Kfar-Saba (IL)

( * ) Notice: Subject to any disclaimer, the term of this patent is extended or adjusted under 35 U.S.C. 154(b) by 322 days.

(21) Appl. No.: 11/718,912

(22) PCT Filed: Nov. 9, 2005

(86) PCT No.: PCT/IL2005/001175
§ 371 (c)(1),
(2), (4) Date: May 9, 2007

(87) PCT Pub. No.: WO2006/051532
PCT Pub. Date: May 18, 2006

(65) Prior Publication Data
US 2009/0056491 A1    Mar. 5, 2009

Related U.S. Application Data

(60) Provisional application No. 60/626,646, filed on Nov. 10, 2004.

(51) Int. Cl.
*B60K 26/00* (2006.01)
(52) U.S. Cl. .................................................. 180/333
(58) Field of Classification Search .......... 74/478, 74/478.5, 481, 482; 180/333; 477/209
See application file for complete search history.

(56) References Cited

U.S. PATENT DOCUMENTS

| | | | | |
|---|---|---|---|---|
| 2,602,348 A | * | 7/1952 | Wilson | 74/484 R |
| 2,724,285 A | * | 11/1955 | Arnold | 74/481 |
| 2,777,335 A | * | 1/1957 | Engberg et al. | 74/481 |
| 2,826,089 A | * | 3/1958 | Hammack | 74/484 R |
| 2,855,797 A | * | 10/1958 | Dunn, Jr. | 74/484 R |
| 3,192,794 A | * | 7/1965 | Pless | 74/481 |
| 4,436,191 A | * | 3/1984 | Perry | 477/209 |
| 4,627,522 A | * | 12/1986 | Ulrich et al. | 192/35 |
| 4,993,509 A | * | 2/1991 | Howell | 180/333 |
| 4,998,983 A | * | 3/1991 | Ruprecht et al. | 477/209 |
| 5,025,905 A | * | 6/1991 | Lenz | 477/209 |
| 5,029,679 A | * | 7/1991 | Kim et al. | 477/209 |
| 5,129,492 A | * | 7/1992 | Lenz et al. | 477/27 |
| 5,542,312 A | * | 8/1996 | Peters | 74/481 |

FOREIGN PATENT DOCUMENTS

| | | |
|---|---|---|
| DE | 197 15 992 | 1/1998 |
| DE | 101 40 187 | 3/2003 |

OTHER PUBLICATIONS

Supplemental European Search Report (citing two German References), Nov. 28, 2008.

* cited by examiner

*Primary Examiner* — Paul N Dickson
*Assistant Examiner* — Robert A Coker
(74) *Attorney, Agent, or Firm* — William H. Dippert; Eckert Seamans Cherin & Mellott, LLC

(57) ABSTRACT

The present invention provides a new hand-operated system for actuating acceleration and brake pedals in a vehicle. The system comprises main body adapted to be fixedly attached to the vehicle in the vicinity of the driver's hands, a handle connected to the main body wherein the handle is adapted to be moved forwardly and backwardly in order to operate the vehicle; two levers pivotally connected to the main body wherein the levers are engaged with the acceleration and brake pedals through connecting rods; and a cable connecting the lever that actuate the acceleration pedal.

15 Claims, 3 Drawing Sheets

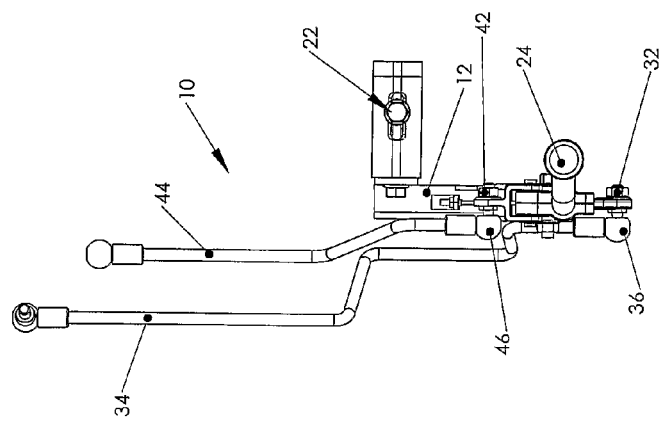
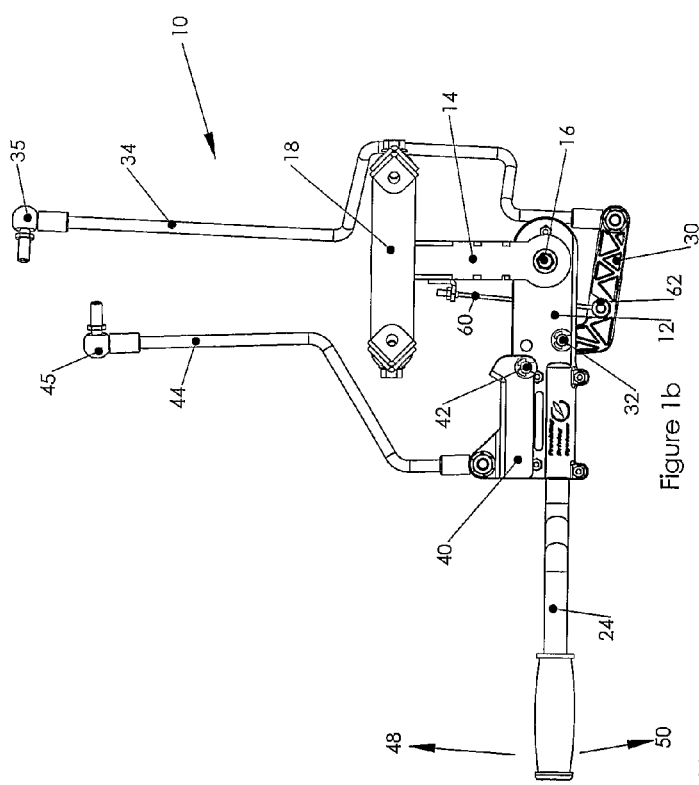
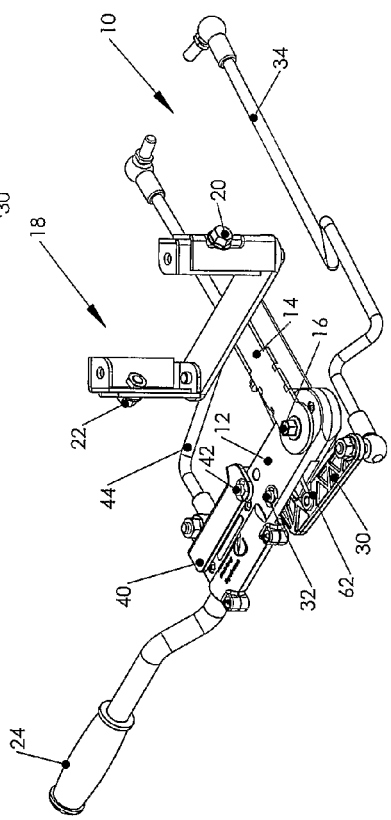

DRIVING ACCESSORY FOR HANDICAPPED DRIVERS

This present application claims the benefit of earlier U.S. provisional patent application Ser. No. 60/626,646 filed on 10$^{th}$ of Nov. 2004 by Fruehling Yoram and entitled "Hand operated system for actuating vehicle acceleration and brake pedals".

FIELD OF THE INVENTION

The present invention relates to hand operable systems for the handicapped. More particularly, the present invention relates to hand operated system for actuating vehicle acceleration and brake pedals.

BACKGROUND OF THE INVENTION

Handicapped people that are limited to use solely their upper body parts are limited to vehicles having hand operated actuating systems. However; this is not the case in the art and vehicles are almost always equipped with leg-operated pedals.

Car conversion systems in which the accelerator and the brake pedals are hand-operated are known in the art. Mostly, add-on systems are provided with operating lever or levers that is engaged with both accelerating pedal and the brake pedal of the car wherein push and pull operations are operated by the hands of the driver. The challenge in engineering and designing such systems lie in the limited space beneath the steering wheel. R&R mobility and Petri+Lehr, for example, sell hand-operated systems for brake and acceleration provided with a lever. Most available systems has levers that directly connect the acceleration and brake pedals to the hand while the levers are based on push only and on a mechanism of a lever residing within a tube, therefore, are not bendable and consequently are limited to being straight and therefore, are limited by the tortuous space beneath the stirring wheel.

There is a long felt need to provide a driving accessory for the handicapped in which the acceleration and brake pedals are hand actuated that is easily operable by push-pull levers. Moreover, there is a need to provide a system that is provided within the space between the pedals and the hand area of the driver without limiting or restricting this space so as to allow a conveniently positioned system.

SUMMARY OF THE INVENTION

It is an object of the present invention to provide an effective and easy vehicle. A hand-operated system that is adapted to allow a handicapped person to use his hands in order to press and release the acceleration and brake pedals of a vehicle.

It is another object of the present invention to provide a hand-operated acceleration and brake system for a vehicle that is adapted to convert push-pull operations using two levers without substantially limiting the space beneath the steering wheel of the car and without limiting the convenience of the driver.

It is yet another object of the present invention to provide a hand-operated acceleration and brake system that is easily add-on system adapted to be installed onto conventional vehicle acceleration and brake pedals.

It is therefore provided in accordance with a preferred embodiment of the present invention a hand-operated system for actuating acceleration pedal and brake pedal in a vehicle, the system comprising:

main body adapted to be attached to the vehicle;

a handle connected to said main body wherein said handle is adapted to be moved forwardly in order to brake the vehicle and backwardly in order to accelerate the vehicle;

a first lever pivotally connected to said main body wherein said first lever is engaged with the brake pedal, wherein a first connecting rod is adapted to connect distant elements;

a second lever pivotally connected to said main body wherein said second lever is engaged with the acceleration pedal, wherein second connecting rod is adapted to connect distant elements;

a cable connecting said first lever said main body;

whereby when said handle is forwardly pushed, said first connecting rod presses the brake pedal and when said handle is backwardly pulled, said second connecting rod is forwardly pushed while pushing the acceleration pedal and disengaging the brake pedal.

Furthermore and in accordance with another preferred embodiment of the present invention, said first connecting rod is connected to said first lever through an angle joint.

Furthermore and in accordance with another preferred embodiment of the present invention, said second connecting rod is connected to said second lever through an angle joint.

Furthermore and in accordance with another preferred embodiment of the present invention, said first lever is connected to the brake pedal through said first connecting means.

Furthermore and in accordance with another preferred embodiment of the present invention, said second lever is connected to the acceleration pedal through said second connecting means.

Furthermore and in accordance with another preferred embodiment of the present invention, a seat is provided to said main body and wherein said seat is provided with a means adapted to connect to a steering column mount.

Furthermore and in accordance with another preferred embodiment of the present invention, said cable is connected to said seat.

Furthermore and in accordance with another preferred embodiment of the present invention, said second connecting rod is provided with a connecting means adapted to connect the rod to the accelerating pedal.

Furthermore and in accordance with another preferred embodiment of the present invention, said first connecting rod is provided with a connecting means adapted to connect the rod to the brake pedal.

Furthermore and in accordance with another preferred embodiment of the present invention, said main body comprises two opposite portions adapted to close in a clam manner.

Furthermore and in accordance with another preferred embodiment of the present invention, said handle is provided in the left hand side of the system.

Furthermore and in accordance with another preferred embodiment of the present invention, said handle is provided in the right hand side of the system.

Furthermore and in accordance with another preferred embodiment of the present invention, said main body is connected in the gear shift vicinity.

In addition and in accordance with yet another preferred embodiment of the present invention, said handle is provided in the right hand side of the system.

BRIEF DESCRIPTION OF THE FIGURES

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and claims.

FIGS. 1a-c illustrate different views of hand operated system for brake and acceleration pedals in accordance with a preferred embodiment of the present invention.

DETAILED DESCRIPTION OF THE INVENTION AND FIGURES

Figure 2:
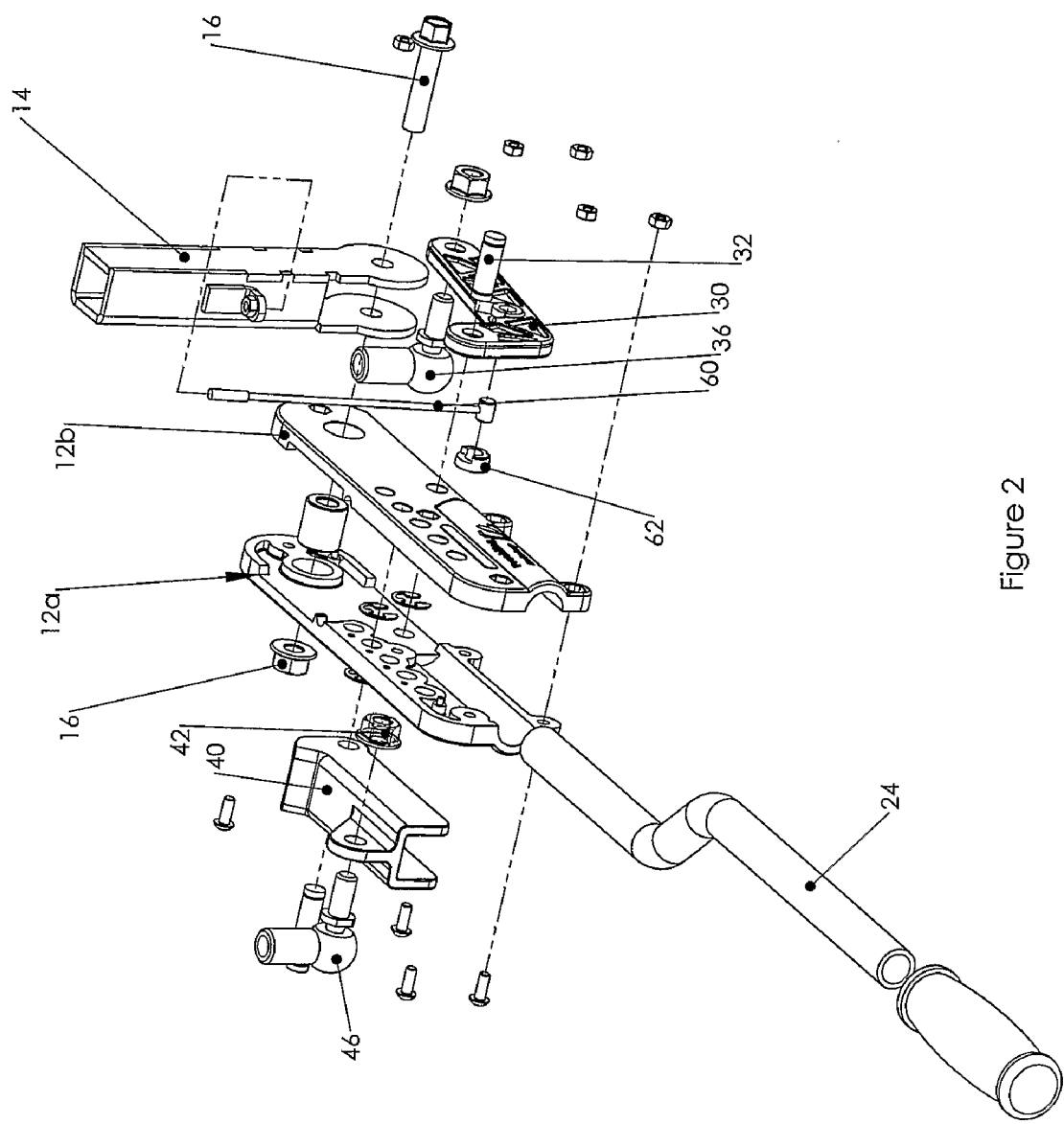
FIG. 2 illustrates exploded view of the hand operated system shown in FIG. 1, depicting the main body and element directly connected to it.

The present invention provides a unique and novel system that is adapted to allow a handicapped person to operate the acceleration and brake pedals of a vehicle using his hands or hand. The system of the present invention is an add-on accessory that is adapted to be installed in a standard vehicle without confining the convenience of the driver. The system is designed while taking into account the limited and tortuous space between the acceleration and brake pedals and the steering wheel between which the system should be installed.

The hand operated system is adapted to convert push-pull movements of a lever engaged with the steering wheel to separated push-pull movements of both the acceleration pedal and the brake pedal. The push-pull lever is connected to the pedals through two rigid connecting rods, each rod connected to one pedal, that are engineered to overcome the restrictions of space along the driver's legs.

Reference is now made to FIGS. 1a-c illustrating different views of hand operated system for brake and acceleration pedals in accordance with a preferred embodiment of the present invention. FIG. 1a illustrates an isometric view of the system in which hand-operated system 10 is shown to have a main body 12 adapted to interconnect the elements of the system. Main body 12 is attached preferably to the steering column mount of the vehicle (the steering column is not shown in the figure, however, this can be any standard steering wheel) by a seat 14 pivotally connected at one side to main body 12 by pivoting bolt and nut 16 and at the other side fixedly attached to the steering column mount by connector 18. Bolts 20 and 22 act as connecting means connecting connector 18 to the mount. Handle 24 is connected to main body 12.

Main body 12 is pivotally connecting two pivoting levers; one of which is actuating the accelerator pedal and the other is actuating the brake pedal. First lever 30 is pivotally connected on one side to main body 12 through a pivot pin 32. The other side of first lever 30 is connected to acceleration connecting rod 34. An angle joint 36 connects first lever 30 to acceleration connecting rod 34 having a distal portion that is connected to the acceleration pedal of the vehicle (the pedals are not shown in the figures). Acceleration connecting rod 34 is bent so as to facilitate its direct connection to the acceleration pedal.

Another pivoting mechanism is provided in the other side of main body 12. A second lever 40 is pivotally connected by pivot pin 42 to brake connecting rod 44 that is connected to the brake pedal. An angle joint 46 connects second lever 40 and brake connecting rod 44 so as to allow the connecting rod to be directed towards the pedals area. In order to better understand the structure of the main body and the elements that are connected to it, an exploded view is provided.

Each of the connecting rod is provided with an angle joint that is adapted to connect the connecting rod to the pedal. Angle joint 35 connects acceleration connecting rod 34 to the acceleration pedal and angle joint 45 connects brake connecting rod 44 to the brake pedal.

Reference is now made to FIG. 2 illustrating exploded view of the hand operated system shown in FIG. 1, depicting the main body and element directly connected to it. Main body 12 comprises two parts built as a two opposite shells, 12a and 12b, that are connected to each other such as a clam. Handle 24 is partially clamped within shells in a fixed manner. First lever 30 is connected to main body 12 through one of the shells 12b and second lever 40 clamps both shells 12a and 12b. Both levers are pivotally connected through pivot pins to the main body.

Returning to FIG. 1c illustrating a side view of the hand-operated system, one can see that the mechanism main body 12 and the surrounding elements occupy a minimal thickness so as to avoid discomfort to the driver. The connecting rods 34 and 44 are bent rods that are adapted to follow the tortuous route from the vicinity of the knees of the driver to the pedals, where they are connected.

The following is an explanation of the actuation of the hand-operated system: when braking is desired, handle 24 is forwardly pushed (in a direction indicated by arrow 48 in FIG. 1b) while pushing brake connecting rod 44 so that the brake pedal is downwardly pressed and braking occurs. At the same time, second lever 30 pivots about pivot pin 32 causing disengagement of accelerating connecting rod 34 from the acceleration pedal so as to avoid any function acted on the acceleration pedal. In order to stop the brake operation, handle 24 is backwardly pulled while forming an angled gap between second lever 40 and main body 12 due to the pivoting movement of the lever about the main body through pivot pin 42. This gap will be consequently closed since the brake pedal will be released while pushing backwardly brake connecting rod 44. Starting position will be achieved again.

In order to accelerate, handle 24 is pulled (in a direction indicated by arrow 50 in FIG. 1b) while disengaging second lever 40; therefore, disengaging the brake pedal to which second lever 40 is connected through brake connecting rod 44. At the same time, first lever 30 is backwardly pushed. In order to achieve the forward movement of acceleration connecting rod 34 by first lever 30, a cable 60 is provided and connects first lever 30 to the seat 14. Cable 60 is pivotally connected to first lever 30 by pivot pin 62 that is positioned relatively close to pivot pin 32. The combined movement of handle 24 in the direction of arrow 50 with the firm grip of cable 60 to seat 14 forces first lever 30 to rotate about pivot pin 32 so that the lever pushes accelerator connecting rod 34 forward and the acceleration pedal is pushed. In order to stop acceleration of the vehicle, handle 24 is released while the gap between first lever 30 and main body 12 is established again and the acceleration pedal is released.

Figure 3A:
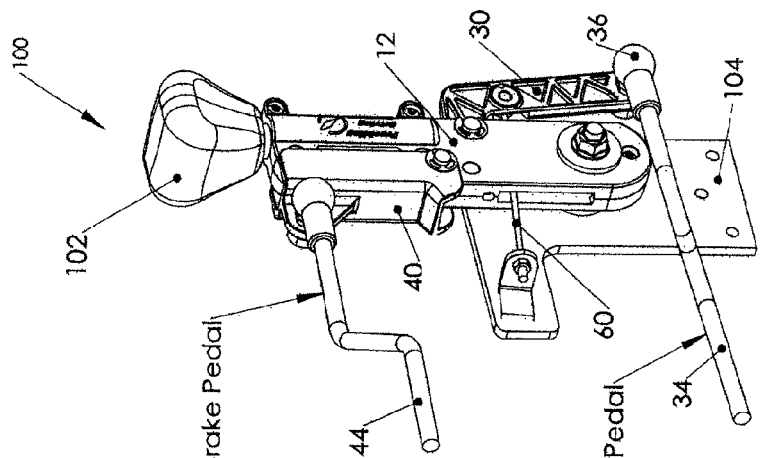
FIGS. 3a-c illustrate different views of a right hand control of hand operated system for brake and acceleration pedals in accordance with another preferred embodiment of the present invention.
Figure 3B:
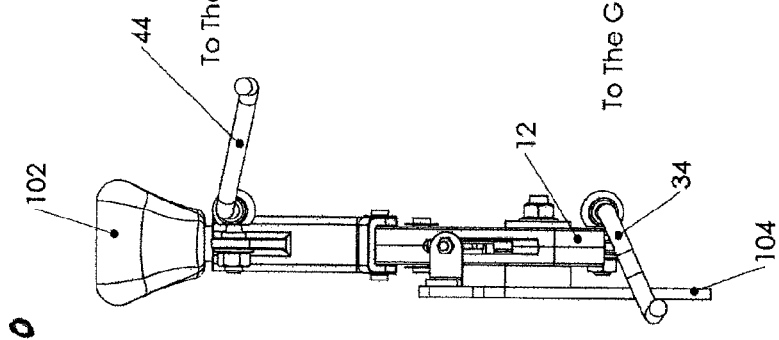
Figure 3C:
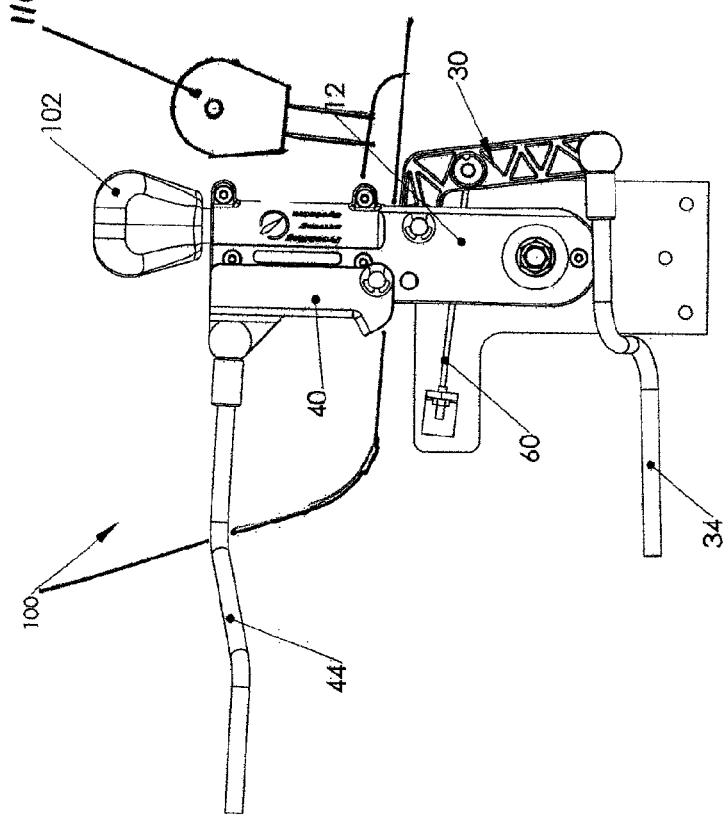

Reference is now made to FIG. 3a-c illustrating different views of a right hand control of hand operated system for brake and acceleration pedals in accordance with another preferred embodiment of the present invention. Basically, the mechanism of the operation is the same, however, there are drivers that prefer a right-hand mechanism of actuation and the present embodiment is designed to resolve this issue.

Similarly to the previously explained embodiment shown in FIGS. 1a-c, two rods 34 and 44 are connected through levers 30 and 40, respectively to main body 12 that actuates the rods. Rods 34 and 44 are adapted to push or pull the acceleration pedal or the brake pedal, respectively (the pedals are not shown in the figures). Handle 102 is arranged to be positioned on the right-hand side of the driver, and it is actuated similarly to handle 24 from the embodiment shown in FIG. 1. Handle 102 is firmly connected to body 12 while push/pull movements of the handle actuate the levers and, consequently, the rods and the pedals of the vehicle. Seat 104 is also firmly connected to body 12, while seat 104 can be attached to an adequate position in the vicinity of the vehicle's gear shift lever 110 so that handle 102 can be activated by the driver from his right side.

The method of the present invention is unique since it allows the use of stiff connecting rods that can not be used in prior art mechanisms. The use of stiff connecting rods allows better control over the acceleration and braking mechanisms in vehicles that are presently used as well as in future vehicles.

Optionally, the left and the right levers that are pivoted can be attached in the side of the pedals instead of the side of the handle.

It should be clear that the description of the embodiments and attached Figures set forth in this specification serves only for a better understanding of the invention, without limiting its scope as covered by the following claims.

It should also be clear that a person skilled in the art, after reading the present specification can make adjustments or amendments to the attached Figures and above described embodiments that would still be covered by the following claims.

The invention claimed is:

1. A hand-operated system for actuating an acceleration pedal and a brake pedal in a vehicle, the system comprising:
    a main body configured to be attached to the vehicle;
        a handle connected to said main body wherein said handle is configured to be moved forward in order to brake the vehicle and backward in order to accelerate the vehicle;
        a first lever pivotally and directly connected to said main body wherein said first lever is engaged with the brake pedal, wherein a first rigid connecting rod is adapted to connect distant elements; and
        a second lever pivotally and directly connected to said main body wherein said second lever is engaged with the acceleration pedal, wherein a second rigid connecting rod is adapted to connect distant elements,
    wherein when said handle is moved forward, said first connecting rod presses the brake pedal and when said handle is moved backward, said second connecting rod is pushed forward while pushing the acceleration pedal and disengaging the brake pedal.

2. The system as claimed in claim 1, wherein said first rigid connecting rod is connected to said first lever through an angle joint.

3. The system as claimed in claim 1, wherein said second rigid connecting rod is connected to said second lever through an angle joint.

4. The system as claimed in claim 1, wherein said first lever is connected to the brake pedal through said first rigid connecting rod.

5. The system as claimed in claim 1, wherein said second lever is connected to the acceleration pedal through said second rigid connecting rod.

6. The system as claimed in claim 1, wherein said main body comprises a seat and wherein said seat is provided with a connector configured to be connected to a steering column mount.

7. The system as claimed in claim 6, wherein a cable is connected to said seat.

8. The system as claimed in claim 1, wherein said second rigid connecting rod is provided with a connector adapted to connect the rod to the acceleration pedal.

9. The system as claimed in claim 1, wherein said first rigid connecting rod is provided with a connector adapted to connect the rod to the brake pedal.

10. The system as claimed in claim 1, wherein said main body comprises two opposite portions configured to be clamped.

11. The system as claimed in claim 1, wherein said handle is provided in the left-hand side of the system.

12. The system as claimed in claim 1, wherein said handle is provided in the right-hand side of the system.

13. The system as claimed in claim 12, wherein said vehicle contains a gear shift and wherein said main body is configured to be connected to said vehicle in the vicinity of said gear shift.

14. The system as claimed in claim 1, further comprising a cable connecting said first lever to said main body.

15. The system as claimed in claim 14, wherein said cable is connected to said seat.

* * * * *